UNITED STATES PATENT OFFICE.

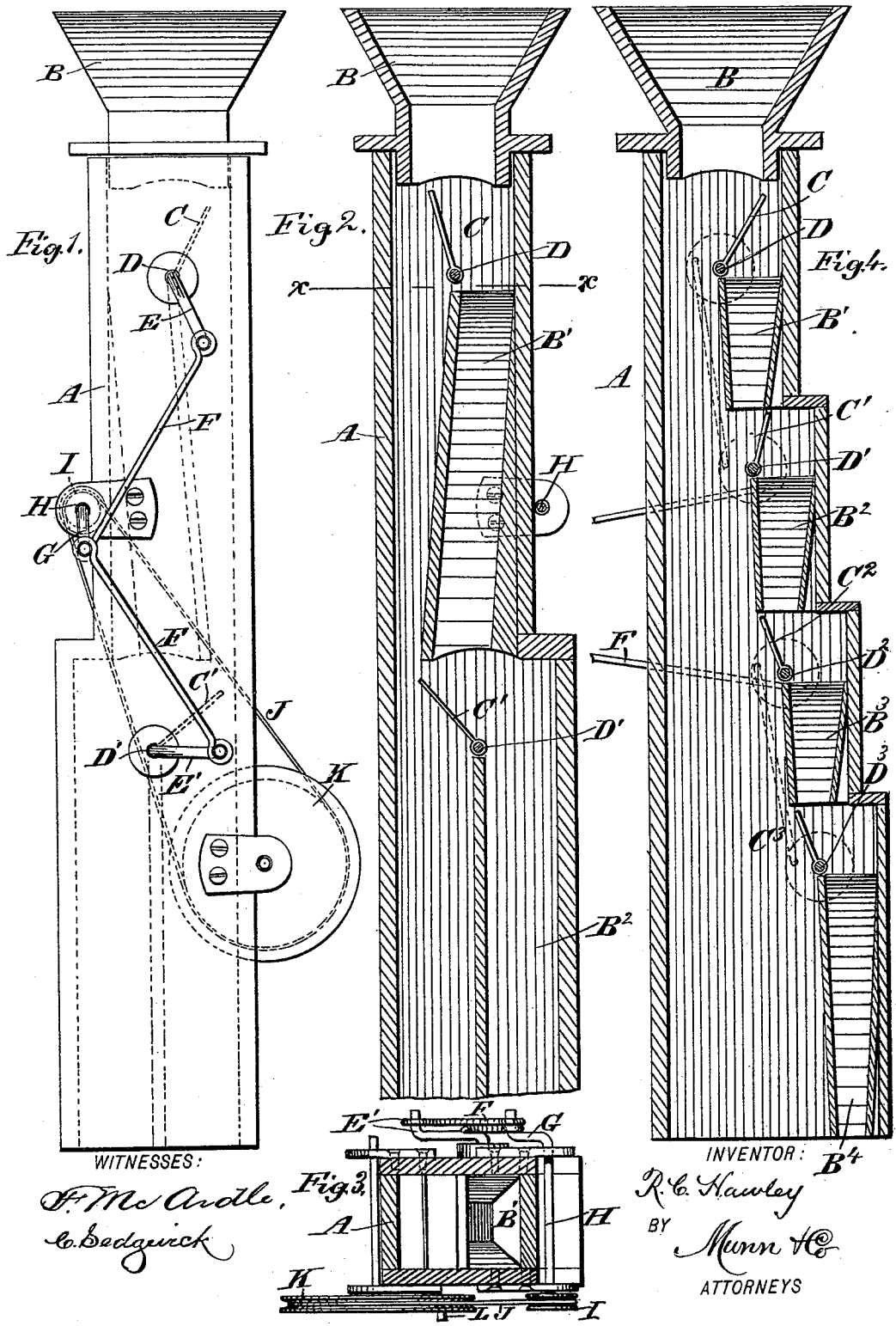

ROBERT C. HAWLEY, OF PUEBLO, COLORADO.

ORE-SAMPLING DEVICE.

SPECIFICATION forming part of Letters Patent No. 463,509, dated November 17, 1891.

Application filed April 3, 1891. Serial No. 387,507. (No model.)

*To all whom it may concern:*

Be it known that I, ROBERT C. HAWLEY, of Pueblo, in the county of Pueblo and State of Colorado, have invented a new and Improved Ore-Sampling Device, of which the following is a full, clear, and exact description.

The object of the invention is to provide a new and improved ore-sampling device which is simple and durable in construction and very effective in operation, giving an accurate sample of any quantity of ore passed through it.

The invention consists of a hopper and dividing-wings arranged under the said hopper to divide the quantity of ore passing down from the hopper into halves.

The invention further consists of hoppers arranged one above the other and dividing oscillating wings arranged alternately with the said hoppers, so that the wing below a certain hopper divides the ore from that hopper into halves, of which one half is guided by the wing into the hopper next below.

The invention also consists of certain parts and details and combinations of the same, as will be fully described hereinafter, and then pointed out in the claim.

Reference is to be had to the accompanying drawings, forming a part of this specification, in which similar letters of reference indicate corresponding parts in all the figures.

Figure 1 is a side elevation of the improvement. Fig. 2 is a sectional side elevation of the same. Fig. 3 is a sectional plan view of the same on the line $xx$ of Fig. 2, and Fig. 4 is a sectional side elevation of the improvement as arranged for a large series of hoppers and wings.

The improved ore-sampling device is provided with a vertically-arranged casing A, on the upper end of which is secured a hopper B, into which the ore to be sampled is placed in any suitable manner. On the lower end of the hopper B is arranged transversely an oscillating dividing-wing C, secured at its lower end on a shaft D, extending transversely and mounted to turn in suitable bearings in the casing A.

The shaft D is arranged directly above the inner side of a second hopper B', secured within the casing A and discharging at its lower end upon a second oscillating wing C', mounted on a shaft D' above and at one side of a third hopper $B^2$, which discharges upon a third wing $C^2$, mounted on a shaft $D^2$ above and at one side of a fourth hopper $B^3$, which discharges upon a fourth wing $C^3$, mounted on a shaft $D^3$, located above and at one side of a fifth hopper $B^4$. Any desired number of such hoppers and wings may be arranged one above the other, the wings alternating with the hoppers.

It will be seen that when ore is introduced through the hopper B and the wing C oscillated the quantity of ore discharged by the hopper B is divided into two equal parts, of which one part passes into the hopper B' and the other drops down the casing A outside of the hopper B'. The part passing down the hopper B' is again divided into two equal parts by the oscillating wing C', one of the parts passing down the hopper $B^2$ and the other part mixing with the ore passing down the casing A and previously divided, and so on. This dividing of the ore is continued until finally a small fraction or sample of the entire amount of the ore introduced in the hopper B has passed out at the last hopper. By increasing or diminishing the number of hoppers and wings an accurate sample of any size may be had from any desired quantity of ore.

In order to oscillate the several wings C C', &c., simultaneously the shafts D D', &c., are provided with crank-arms E E', &c., connected by links F with a crank-arm G, held on a shaft H, mounted to turn in suitable bearings on the outside of the casing A. On the shaft H is arranged a pulley I, over which passes a belt J, also passing over a large pulley K, having a crank-arm L for conveniently turning the said pulley so as to revolve the shaft H, which by its crank-arm G, the links F, and the crank-arms E E' imparts an oscillating motion to the shafts D D', and consequently to the wings C C'.

In case more than two wings are employed, as illustrated in Fig. 4, the respective crank-arms E E', &c., may be connected with each other and by the links F connected with an eccentric or other suitable means for imparting an oscillating motion to the wings.

I do not limit myself in any way whatever to the means for imparting an oscillating motion to the wings.

It will be seen by this device that all the ore which enters this machine, whether fine or coarse, is accurately divided and cut down to the size sample desired. At the same time the oscillation of the wings causes all the fine particles and dust to fall out of the machine and prepares it to receive the next lot of ore to be sampled without special preparation or the cleaning of the casing and the parts held therein.

Having thus fully described my invention, I claim as new and desire to secure by Letters Patent—

In a sampling device, the combination, with a casing and hoppers arranged in the said casing one above the other, of dividing-wings held in the said casing and arranged alternately with the said hoppers, the several wings being connected for simultaneous operation so that the wing below one hopper divides the material passing down said hopper into two equal parts, of which one part is guided by the wing to the hopper next below, while the other part drops down the casing outside of the hoppers, and means, substantially as described, for imparting an oscillating motion to the said wings, as set forth.

ROBERT C. HAWLEY.

Witnesses:
M. B. GERRY,
W. C. CAMPBELL.